United States Patent
Ebermann et al.

(10) Patent No.: US 7,103,423 B2
(45) Date of Patent: Sep. 5, 2006

(54) METHOD FOR PROCESS-VARIABLE-DEPENDENT IDENTIFICATION SIGNAL EMISSION

(75) Inventors: Joachim Ebermann, Amtsberg (DE); Kay Grammatke, Pleiba (DE); Horst Stiehler, Burgstaedt (DE)

(73) Assignee: Siemens Aktiengesellschaft, Munich (DE)

(*) Notice: Subject to any disclaimer, the term of this patent is extended or adjusted under 35 U.S.C. 154(b) by 720 days.

(21) Appl. No.: 09/928,946

(22) Filed: Aug. 13, 2001

(65) Prior Publication Data

US 2002/0169510 A1 Nov. 14, 2002

(30) Foreign Application Priority Data

May 11, 2001 (DE) .................... 101 22 905

(51) Int. Cl.
 *G05B 13/02* (2006.01)

(52) U.S. Cl. .......................... 700/33; 702/79
(58) Field of Classification Search .................. 700/29, 700/30, 33, 37, 41–43, 306; 702/79
See application file for complete search history.

(56) References Cited

U.S. PATENT DOCUMENTS

| | | | | | |
|---|---|---|---|---|---|
| 4,639,853 | A | * | 1/1987 | Rake et al. .................. 700/29 |
| 5,559,474 | A | * | 9/1996 | Matsumoto et al. .......... 331/17 |
| 5,568,377 | A | * | 10/1996 | Seem et al. .................. 700/37 |
| 5,586,150 | A | * | 12/1996 | Balasubramaniam ....... 375/354 |
| 5,835,541 | A | * | 11/1998 | Namekata et al. .......... 375/355 |
| 6,018,554 | A | * | 1/2000 | Glover ........................ 375/345 |
| 6,222,876 | B1 | * | 4/2001 | Hirth et al. .................. 375/224 |
| 6,385,023 | B1 | * | 5/2002 | Pednekar et al. ............. 361/70 |
| 6,549,859 | B1 | * | 4/2003 | Ward ............................ 702/66 |
| 6,571,186 | B1 | * | 5/2003 | Ward ............................ 702/74 |
| 6,675,000 | B1 | * | 1/2004 | Ichikawa .................. 455/127.3 |
| 2002/0154620 | A1 | * | 10/2002 | Azenkot et al. ............ 370/347 |

* cited by examiner

*Primary Examiner*—Anthony Knight
*Assistant Examiner*—Sunray Chang
(74) *Attorney, Agent, or Firm*—Baker Botts L.L.P.

(57) ABSTRACT

The invention relates to a method for process-variable-dependent identification signal emission for a closed-loop and/or open-loop control program with cyclic sampling of process variables from a technical process. A threshold value crossing time (ts1, ts3) is determined from at least two previous samples (AT1, AT2, AT5–AT7) of a process variable (P). At this time, an identification signal can be triggered, which can call up a single-stage or multi-stage command sequence. The threshold value crossing time (ts1–ts3) can likewise be determined with the aid of a mathematical approximation function and the samples (AT1, AT2, AT5–AT7). A timing mechanism can be started in the predicted sampling cycle (A12 to A89) preceding the threshold value crossing (SD1–SD3) using a time difference (ZD1–ZD3) remaining until the threshold value crossing (SD1–SD3). The threshold value crossing time (ts1–ts3) is determined once again using a further, subsequent sample (AT1, AT2, AT5–AT7) and the approximation function, and the remaining time difference (ZD1–ZD3) of the timing mechanism is adapted once again if necessary.

6 Claims, 2 Drawing Sheets

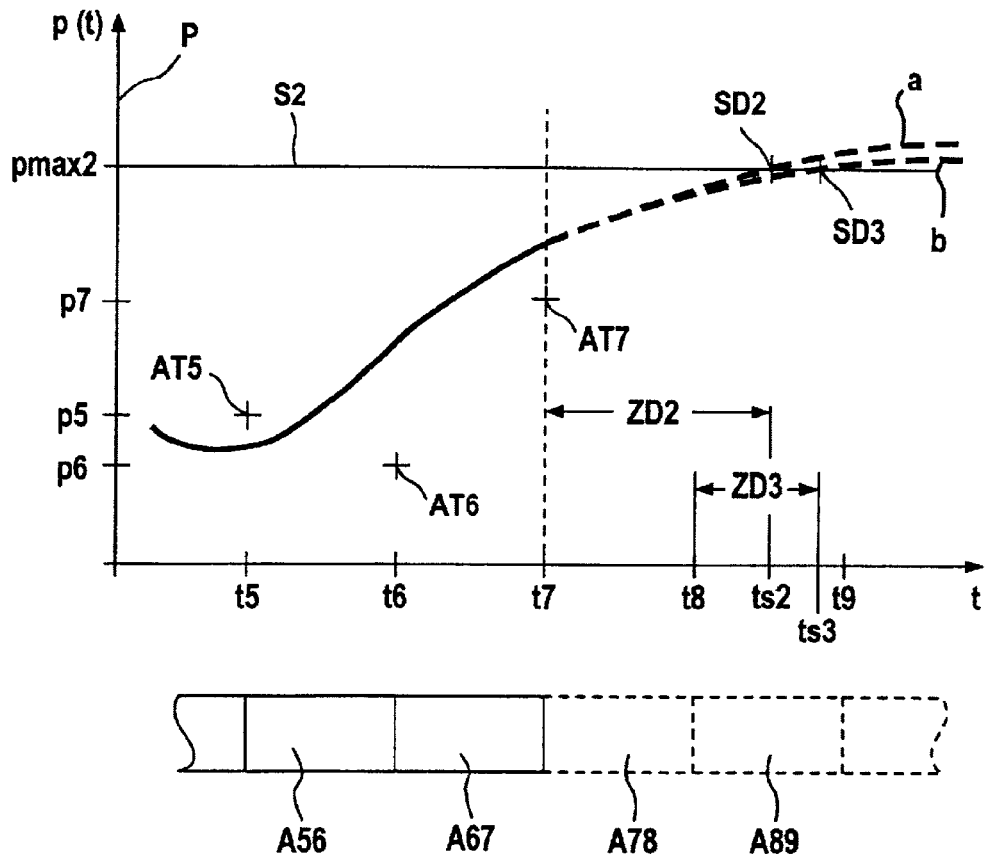
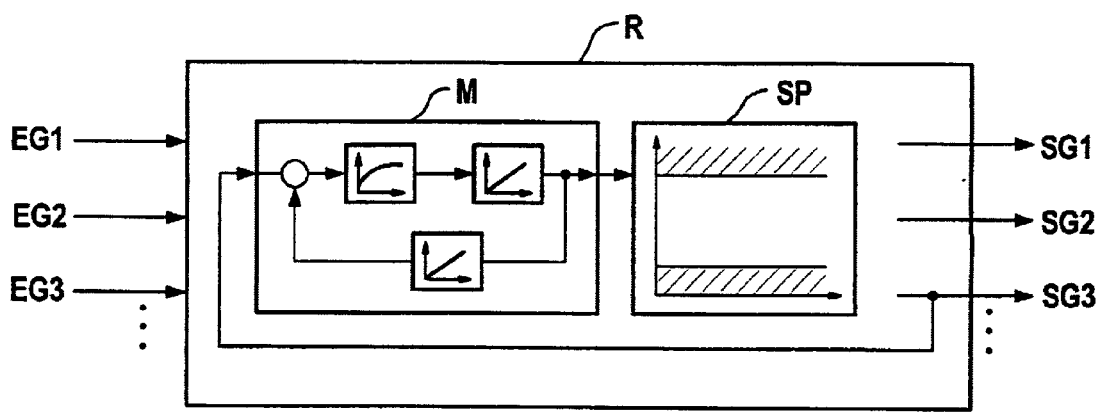
FIG 2
FIG 3

//METHOD FOR PROCESS-VARIABLE-DEPENDENT IDENTIFICATION SIGNAL EMISSION

TO ALL WHOM IT MAY CONCERN

Be it known that WE, JOACHIM EBERMANN, KAY GRAMMATKE and HORST STIEHLER, citizens of Germany; whose post office addresses are AM Suedhang 57, 09439 Amtsberg, Germany; Rabensteiner Str. 7, 09246 Pleiβa, Germany; and Wittgendorfer St. 4, 09217, Burgstaedt, Germany, respectively, have invented an improvement in

METHOD FOR PROCESS-VARIABLE-DEPENDENT IDENTIFICATION SIGNAL EMISSION of which the following is a

SPECIFICATION

FIELD OF THE INVENTION

The invention relates to a method for process-variable-dependent identification signal emission for an open-loop and/or closed-loop program with cyclic sampling of process variables for a technical process.

BACKGROUND OF THE INVENTION

Today, machines and systems are controlled by microcomputer-aided control assemblies in which process variables of the technical process, such as movement, pressure, temperature etc., are processed in an open-loop and/or closed-loop control program. The process variables are generally sampled and processed cyclically. At the sampling time, the instantaneous values of the process variables are recorded, and they are passed on for processing. In the time period between the two samples, the open-loop and/or closed-loop control program refers to the instantaneous values during processing steps.

For specific control tasks, it is necessary to generate specific identification signals for a machine or system when threshold values of a process variable are overshot or undershot. Additional comparison and circuit parts in the form of memories are provided for this purpose, in which the instantaneous value of the process variable is continuously compared with the threshold value. An identification signal is generated if the threshold value is crossed in a specific direction, or is in the region between two threshold values. One such comparison and circuit part is required for each process variable to be monitored.

The object of the invention is to provide a cost-effective and technically optimized solution for monitoring the overshooting or undershooting of process variable threshold values in a technical system in which process parameters are sampled cyclically.

SUMMARY OF THE INVENTION

According to the present invention, the aforesaid object is achieved by determining a threshold value crossing time from at least two previous samples of a process variable having at least one threshold value. In accordance with this novel method there is no need for any comparison and circuit parts, since a threshold value crossing time is predicted with the aid of program steps.

In a preferred embodiment of the present invention a timing mechanism is started with the time difference between the process variable detection and the threshold value crossing, and provides an identification signal when this time difference is reached. A hardware mechanism can thus be triggered independently of the sampling cycle, or else independently of a processor clock, with the aid of the identification signal.

In another preferred embodiment of the present invention a single-stage, or multi-stage command sequence is processed on the basis of one occurrence of the identification signal of the lapsed time difference. Before a specific action is triggered, the identification signal can be used to call up a command sequence, such as a subroutine, which is called up by an interrupt and in which decisions are made depending on the process situation.

In yet a further preferred embodiment of the present invention is that the threshold value crossing time is determined from samples of a process variable with the aid of a mathematical approximation function. This makes it possible not only to characterize the process variable profile by linear extrapolation of at least the last two samples, but also to describe a process-variable profile with the aid of various mathematical functions. This allows the process variables to be described accurately and adaptively.

A further preferred embodiment of the present invention includes the following:

characteristic values of a technical process are detected;
the characteristic values are used to form a model simulation of the open-loop and/or closed-loop control path in an open-loop and/or closed-loop control program;
at least one manipulated variable for the technical process is supplied to the model simulation; and
a threshold value crossing time is determined by the model simulation.

A further preferred embodiment of the present invention is where the threshold value crossing time is determined in each remaining sampling cycle, using updated instantaneous values of the process variable; the timing mechanism is initialized with a remaining time difference in each sampling cycle which precedes the sampling cycle in which the threshold value crossing is expected; and the timing mechanism is restarted with an updated time difference in the following sampling cycles, provided the threshold value crossing has not occurred.

DRAWINGS

A preferred embodiment of the present invention is described in more detail in the following text and in the context of the drawings in which:

FIG. 2 shows a process variable profile of cyclic samples, which is approximated using a mathematical function; and FIG. 3 shows a symbolic closed-loop control program with a model simulation of an open-loop and/or closed-loop control path.

DETAILED DESCRIPTION OF THE INVENTION

Figure 1:
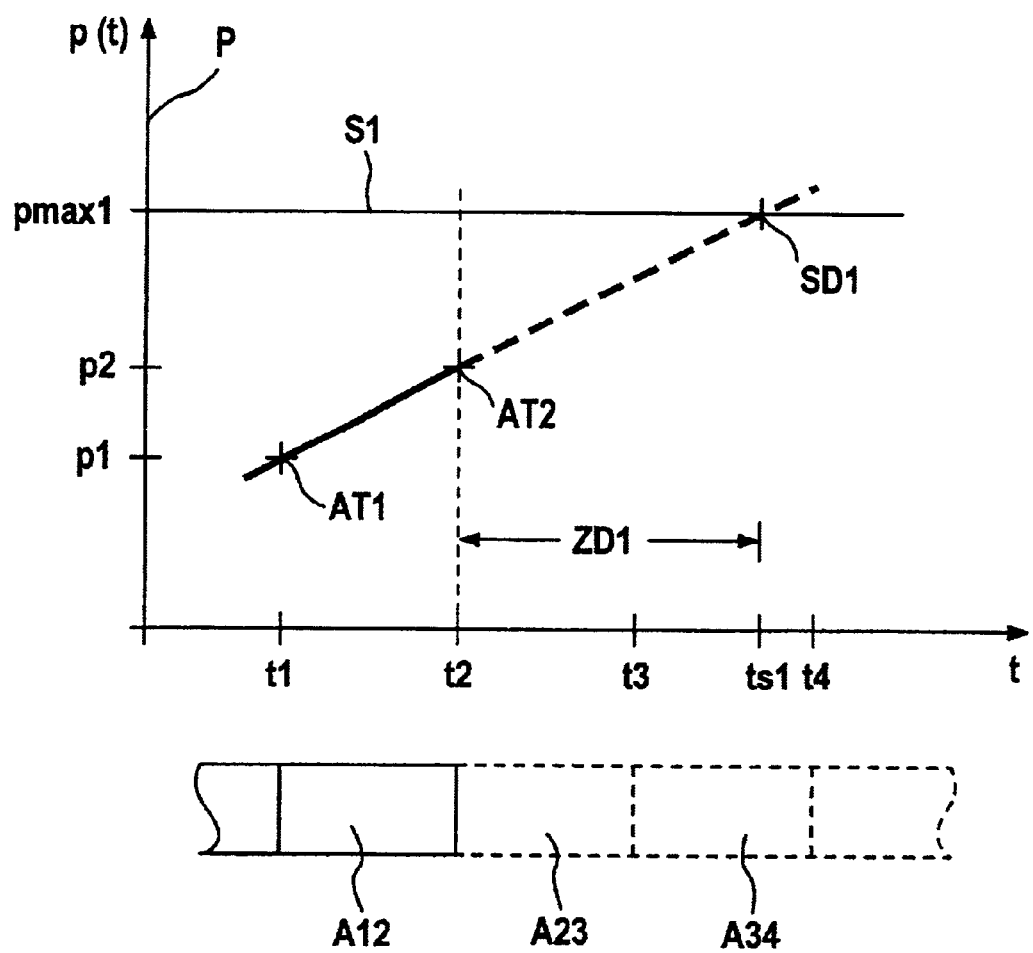
FIG. 1 shows a linearly approximated process variable profile of cyclic samples.

In the graph in FIG. 1, two cyclic samples AT1, AT2 are plotted against a time axis t. The x axis, denoted by t, has the cyclic time subdivisions t1 to t4. A further time marker ts1 indicates the end of a time difference ZD1, which extends from the time t2 until ts1.

Samples of a process variable P are plotted on the y axis. The y axis is denoted as P(t). The samples AT1, AT2 have, respectively, associated instantaneous values p1, p2, and are likewise plotted on the y axis. Furthermore, the graph shows a threshold value S1, which is identified as pmax1 on the y axis. The threshold value S1 is shown as a horizontal line in FIG. 1.

The samples AT1, AT2 represent the instantaneous values p(t) recorded at the time t2. The time t2 is identified on the graph by a vertically running dashed line. The samples AT1 and AT2 are connected by a solid line, which is continued by a dashed line at the same gradient after the time t2. At the threshold value crossing time ts1, this straight line dissects the threshold value S1, thus identifying the threshold value crossing SD1. There is a time difference ZD1 between the present time t2 and the threshold value crossing time ts1.

The samples AT1 and AT2 can be used to deduce a threshold value crossing time ts1 by linear extrapolation with the aid of an open-loop and/or closed-loop control program. For example, the time difference ZD1 remaining until ts1 can be used to start a timer which provides an identification signal when this time elapses, and the occurrence of which can initiate an action which is independent of the sampling cycle. The setting up of a timer allows time intervals to be defined, immediately following which an action is intended to be carried out, even at a time between two samples.

The sampling cycles A12 to A34 are shown below the time axis t of the graph in FIG. 1 in the form of rectangular time intervals. Sampling cycles A23 and A34 which have not yet taken place at the time t2 are shown with dashed borders.

In the embodiment of the invention shown in FIG. 1, an open-loop and/or closed-loop control program can predict the threshold value crossing time ts1 in the sampling cycle A34. No hardware assemblies, such as comparators, are required to do this. Since the system knows the time ts1 in advance, it is also feasible for measures to be initiated in advance to largely prevent the instantaneous values p1, p2 of the process variable P from overshooting. These measures may, for example, depend on the gradient of the approximation function of the samples AT1 and AT2, and/or of the time difference ZD1. A preferred feature here is that the system is already expecting the process variable P to overshoot a threshold value S1. When using hardware comparators, it is impossible to react to an event until it occurs. Taking into account the signal delay time and processing time, the process variable P may already have risen well above the threshold value S1 at the reaction time.

The graph in FIG. 2 shows a process variable profile of cyclic samples, which is approximated using a mathematical function. The sample AT5 was recorded at the time t5, the sample AT6 at the time t6, and the sample AT7 at the time t7. The instantaneous values of the process variable P are identified by P5 to P7 on y axis p(t). Furthermore a threshold value S2 is shown as a horizontal line on the graph, and is identified as pmax2 on the y axis. The samples AT5 to AT7 are described by a mathematical approximation function and are shown by a solid line until the time t7. The rest of the function profile is shown split into two dashed lines and identified by a) or b). An open-loop and/or closed-loop control program can determine that the threshold value crossing time ts2 or ts3, respectively, will occur in the sampling cycle A89.

The instantaneous sampling time t7 is also shown in FIG. 2 by a vertical dashed line. Since the initially predicted threshold value crossing time ts2 occurs in the next sampling cycle A89 after this time, the timing mechanism is started using the time difference ZD2 relating to the time t7. If there are a number of sampling cycles A12 to A89 between the instantaneous sampling time and the threshold value crossing time ts1 to ts3, then the updating of the process variables P can lead to a new threshold value crossing time ts1 to ts3 being determined.

This is the situation shown in the graph in FIG. 2. It is assumed that the approximation function profile changes, on the basis of a future sample at the time t8, in such a manner that its values are no longer on the dashed function line a), but instead on the function line b). This results in a new threshold value crossing SD3 at the time ts3. The timer, which originally times out at the planned time ts2, is started at the time t8 with a newly determined remaining time difference ZD3, and now times out at the time ts3. This continual readjustment of the threshold value crossing time ts1 to ts3 allows more accurate prediction of threshold value crossings SD1 to SD3.

FIG. 3 shows a symbolic closed-loop control program with a model simulation of an open-loop and/or closed-loop control path. In this case, an open-loop and/or closed-loop control program R has the input variables EG1 to EG3 and the manipulated variables SG1 to SG3. The open-loop and/or closed-loop control program R has a rectangular outer contour to which the input variables EG1 to EG3, which are represented by arrows, lead. The manipulated variables SG1 to SG3 represent output variables from the open-loop and/or closed-loop control program R. Further input variables EG1 to EG3 and manipulated variables SG1 to SG3, which are not shown for the sake of clarity, are each represented by three vertically aligned dots underneath the arrow input and output variables.

A model simulation M of a technical process is contained in the open-loop and/or closed-loop control program R. This simulation M was produced from knowledge of the characteristic values relating to the process. An arrow-like link leads from the model simulation M to a block diagram denoted as SP. This provides a threshold value check in the open-loop and/or closed-loop control program R. At least one manipulated variable SG1 to SG3 is passed from the open-loop and/or closed-loop control program R to the model simulation M. This is indicated by an arrow-like link from the manipulated variable SG3 to the model M.

Knowledge of the dynamic characteristic values of the technical process allows the future profile of a process variable P to be determined considerably more exactly. Depending on the requirements, it is possible to use a model M of greater or lesser complexity. It is even feasible to use an adaptive model in this case. The profile of a process variable P thus allows specific parameters to be refined or updated.

It is also feasible to use a future threshold value crossing SD1 to SD3 to vary a manipulated variable SG1 to SG3 even in advance by means of an open-loop and/or closed-loop control program R, so as to achieve a counteracting effect on the profile of the process variable P.

When simulating the profile of a process variable P, it is possible for a mathematical approximation function represented by the samples AT1, AT2, AT5–AT7 to directly have the profile of an $n^{th}$ order mathematical function. However, it is also possible to use a filter function before the simulation of the function profile, so that the measured values do not necessarily coincide with some of the function values of the approximation function. This is the case with the function profile for the process variable P, shown in the graph in FIG. 2. A filter function filters out, for example, noise around the samples AT1, AT2, AT5–AT7, and then uses an approximation function to determine a function profile. Furthermore, hardware filtering is also feasible, filtering the samples AT1, AT2, AT5 to AT7 before processing them in an open-loop and/or closed-loop control program R.

We claim:

1. A method for monitoring a technical system having a process variable and an associated threshold parameter value therefore which are sampled cylically comprising emmission of a process-variable-dependent identification signal for a control program selected from the group consisting of a closed-loop, open-loop and closed-loop and open-loop control program with cyclic sampling of at least one of said process variables and determining a threshold value crossing time from at least two previous samples of a process variable having at least one threshold value, wherein a timing mechanism is started using a time difference between a last sampled process variable and the determined threshold value crossing time, and wherein the timing mechanism provides for an identification signal independent form said cyclic sampling when said time difference has passed.

2. The method according to claim 1, further comprising processing a single-stage or multi-stage command sequence on the basis of one occurrence of the identification signal of the reached time difference.

3. The method according to claim 1, further comprising determining the threshold value crossing time from samples of a process variable with the aid of a mathematical approximation function.

4. The method according to claim 1, further comprising detecting characteristic values of a technical process; using the characteristic values to form a model simulation of a control path in the control program; supplying at least one manipulated variable for the technical process to the model simulation; and determining a threshold value crossing time by the model simulation.

5. The method according to claim 4, further comprising determining the threshold value crossing time in each remaining sampling cycle using updated instantaneous values of the process variable and initializing the timing mechanism with a remaining time difference in each sampling cycle which precedes the sampling cycle in which the threshold value crossing is expected, and restarting the timing mechanism with an updated time difference in the following sampling cycles, provided that the threshold value crossing has not occurred.

6. The method according to claim 1, further comprising determining the threshold value crossing time in each remaining sampling cycle using updated instantaneous values of the process variable and initializing the timing mechanism with a remaining time difference in each sampling cycle which precedes the sampling cycle in which the threshold value crossing is expected, and restarting the timing mechanism with an updated time difference in the following sampling cycles, provided that the threshold value crossing has not occurred.

* * * * *